Nov. 11, 1924.

H. GARNER ET AL 1,515,574

ALL WEATHER BODY FOR VEHICLES

Filed Oct. 3, 1922    5 Sheets-Sheet 1

H. GARNER ET AL 1,515,574

ALL WEATHER BODY FOR VEHICLES

Filed Oct. 3, 1922   5 Sheets-Sheet 3

Inventors-
Henry Garner and
James Parker Garner.
By B. Aniger, Atty.

Nov. 11, 1924.

H. GARNER ET AL

1,515,574

ALL WEATHER BODY FOR VEHICLES

Filed Oct. 3, 1922     5 Sheets-Sheet 5

Patented Nov. 11, 1924.

1,515,574

UNITED STATES PATENT OFFICE.

HENRY GARNER AND JAMES PARKER GARNER, OF BIRMINGHAM, ENGLAND.

ALL-WEATHER BODY FOR VEHICLES.

Application filed October 3, 1922. Serial No. 592,172.

*To all whom it may concern:*

Be it known that we, HENRY GARNER and JAMES PARKER GARNER, both subjects of the King of Great Britain, and residents of "Avalon," Wake Green Road, Moseley, Birmingham, in the county of Warwick, England, and 37 Forest Road, Moseley, aforesaid, respectively, have invented certain new and useful Improvements in All-Weather Bodies for Vehicles; and we do hereby declare the following to be a full, clear, and exact description of the same.

This invention relates to all-weather bodies for vehicles and is primarily intended for motor road vehicles.

One of the objects of the present invention is to construct an all-weather body which will be completely collapsible and which will be of neater appearance both when extended and when collapsed than those at present generally in use.

Our invention is, however, equally applicable to vehicles which have roofs or tops which are a fixture.

A further object of the present invention is to construct a collapsible all-weather body which can be moved from its folded to its extended position or vice versa more quickly and with less difficulty than with those at present generally in use.

A further object of the present invention is to construct a collapsible all-weather body which will have the appearance of an ordinary open touring car when the all-weather body has been collapsed and which will have the appearance of a permanent saloon body when the collapsible all-weather body is erected, the whole structure being less weighty than the all-weather bodies at present in use. Further, our improved all-weather body is constructed so that any desired ventilation can be obtained within the vehicle body.

In connection with motor road vehicles, in order to obtain a maximum width of body for seating accommodation, with a given width of gravel and wheel track, it has for many years been the practice to curve the sides of the body and the doors outwardly from the bottom to the top. Further, it is the common practice to construct the sides of vehicles so that they are longitudinally curved in addition to being curved from top to bottom, so that the body approximates to stream line or boat shape. One of the objects of the present invention is to provide a construction whereby the open spaces left at the sides of the vehicle when the hood is extended may be filled by means of sliding windows adapted to enter pockets in the doors and sides of the vehicle whilst maintaining both upon the inner and outer sides of the doors and body panels the usual curvature employed to give a maximum width of seating accommodation and preserve the stream line shape.

A further object of our invention is to construct a collapsible all-weather body wherein accidental breakage to windows is entirely eliminated and to reduce the tendency to rattle.

A further object of the present invention is to provide a collapsible element for filling the space at each side of the vehicle which can be used in conjunction with many existing types of folding hood or fixed top and which will not necessitate a special construction of hood frame.

A further object of the present invention is to construct an all-weather body which includes windows sliding in pockets in the doors and sides of the vehicle and to provide improved means for raising the windows.

A further object of the present invention is to construct the side elements quite independently of the hood frame so as to enable the side elements to be extended or collapsed to any required degree quite irrespective of the position of the hood.

A further object of the present invention is to provide an improved construction of sliding windows which will not rot or become mouldy or be otherwise affected if lowered into the pockets in the vehicle sides in a damp or wet condition. This is a defect which is associated with the use of what are known as "side curtains" which consists of flexible transparent panels secured into a frame of flexible fabric.

A further object of the present invention is to construct an all-weather body which has no loose parts.

A further object of the present invention is to provide an improved construction of sliding window whereby a maximum amount of light is obtained for the interior of the car and whereby other important advantages will be obtained.

A further object of the invention is to construct a resilient transparent window comprising a sheet of flexible transparent material stiffened at its edges by independent members which are either of the same co-efficient of expansion as the main sheet or are associated therewith in such manner that relative expansion may take place between the stiffening members and the main sheet without buckling the main sheet.

A further object of the present invention is to provide improved guiding members for the sliding edges of such windows.

A further object of the present invention is to improve the lighting and ventilation of vehicles by providing a window at the rear of the vehicle.

Our invention comprises certain other improved features of construction and combination which will be hereinafter described and claimed.

Referring to the drawings:—

Figure 1:
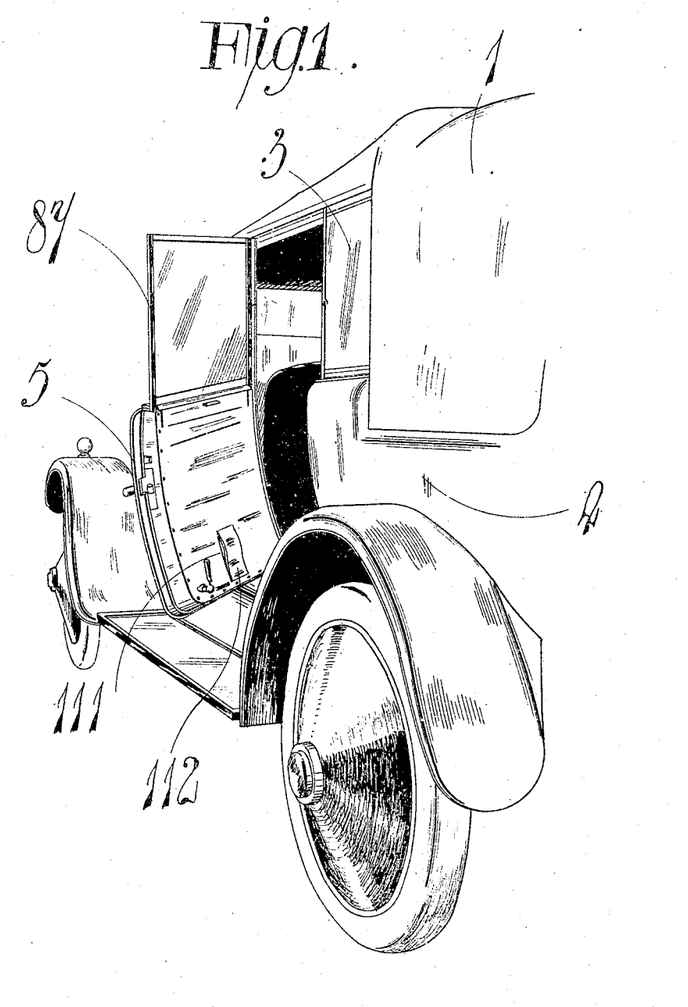
Figure 1 is a perspective view of the automobile with one of the doors open and the sliding window in this open door extended.

The general arrangement of our improved collapsible all-weather body is shown in Figure 1. In this construction the automobile is shown with a collapsible hood 1 which may be of any suitable or usual construction. It is preferred to employ a folding hood which when extended leaves at the sides of the vehicle two open spaces, one at each side of the vehicle. The invention can, however, be applied to vehicles having folding hoods where these spaces are not truly rectangular.

These spaces are filled by collapsible elements designated as a whole 3 which are completely collapsible into pockets in the sides 4 and doors 5 of the vehicle. By the expression "completely collapsible" we infer that the constituent elements of the side units 3 can be folded completely out of sight into the pockets in the body panels 4 and doors 5 of the vehicle. Further, the pockets are provided at their upper parts with closing members so that after the units 3 have been folded away, the normal appearance of an open touring car is restored.

The details of the elements which constitute the side units 3 and the details of the pockets and their closures which receive such elements are hereinafter fully described. The sliding windows employed in these elements 3 are preferably resilient of flexible. This construction has several advantages. The employment of flexible or resilient windows for this purpose enables the inner surfaces of the body panels and the doors to retain the curved form both longitudinally and from top to bottom, which is usually employed and which allows the maximum width of seating accommodation to be obtained. This feature is illustrated particularly in Figures 1 and 13, where the curved form of the inside of one of the doors can be clearly seen.

The windows employed are preferably of a construction which includes a sheet of transparent celluloid having stiffening portions at its edges which impart thereto a degree of resiliency, which, whilst permitting the window to take the curvature of the pocket, is sufficiently stiff to cause the window always to spring into a flat position when moved out from the pocket.

The employement of a window of this construction permits of the window being pushed upwardly from the bottom and is a more convenient way of raising the window than groping into the top of a narrow pocket with the fingers.

Further, the employment of a resilient window permits of the fitting of windows to the rear of the rear doors of an ordinary motor vehicle. The body of an ordinary motor vehicle to the rear of the rear doors is usually of a peculiarly curved shape and has a lower portion of an arch-like form for accommodating the wheel and an upper portion which is curved sharply outwardly over the wheel. Obviously, the shape of the window pocket in this portion of the body is necessarily somewhat sharply curved, and the provision of the resilient windows enables us to fit sliding windows in this position, a feature which it is believed has not hitherto been accomplished.

Another advantage obtained by employing windows of resilient construction is that such windows can accommodate themselves to any distortion of the body which is well known to take place in motor road vehicles owing to their travelling over or standing upon uneven ground. Further, transparent resilient windows made of celluloid or analogous material are much lighter than are glass windows and are consequently much more easily sustained in a raised position.

In addition to these advantages, by employing windows of resilient construction the breakages due to the slamming of doors are avoided.

It is the common practice to construct the bodies of motor road vehicles and the doors attached thereto of stream line shape, i. e. the bodies and doors are curved from top to bottom and from front to rear. Further, the curvature is not a regular one, the curve at the top of the door, for instance, frequently being a different curve from that at the bottom of the door. The curve at the forward verticle edge of the door is also a different curve from that at the rear vertical edge of the door. This also applies to the body panels adjacent to the door. Consequently, in providing for a window to slide in a door pocket or body panel pocket, it is necessary for the window actually to twist when it is lowered into the pocket. This can only be avoided by making the doors or body panels much thicker than is desirable so as to obtain a rectilinear pocket. Our construction of resilient windows enables the thickness of the doors and body panels to be kept at a minimum, as our improved windows are able to twist when they enter the pockets and will automatically straighten themselves when they are drawn out of the pockets.

Figure 2:
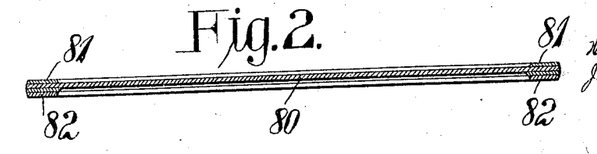
Figure 2 is a detail transverse sectional view of the window.
Figure 3:
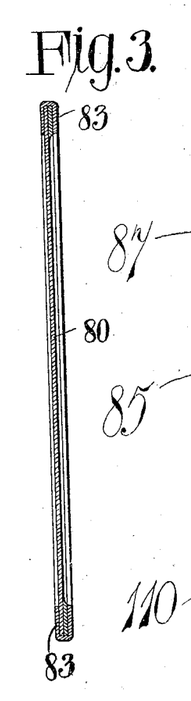
Figure 3 is a detail vertical sectional view of the same.

The window itself consists of a thin sheet 80 of transparent flexible material such as celluloid thickened at its vertical edges by strips of celluloid 81 and 82 which are secured to the sheet 80 by a suitable cement and by the application of heat and pressure. Other means for securing these strips may be employed if desired and in some cases a transparent flexible window of the general form shown may be constructed by making the thickened edges integral with the sheet 80. This may be done in the manufacture of the sheet by pressure means.

As will be seen from Figures 2 and 3, the vertical edges of the sheet 80 are thickened on one side by single strips 81 and upon the other side by two strips 82. At the top and bottom edges, however, the strip 81 and one of the strips 82 are omitted and metal channels 83 are secured to the edges of the window for the purpose of taking the wear. The whole of the edges of the window are thus of the same thickness. The metal channels 83 are preferably secured to the window by rivets passing through slots therein in the manner described hereinafter with reference to Figures 14 and 15 or 16.

Figures 4, 5:
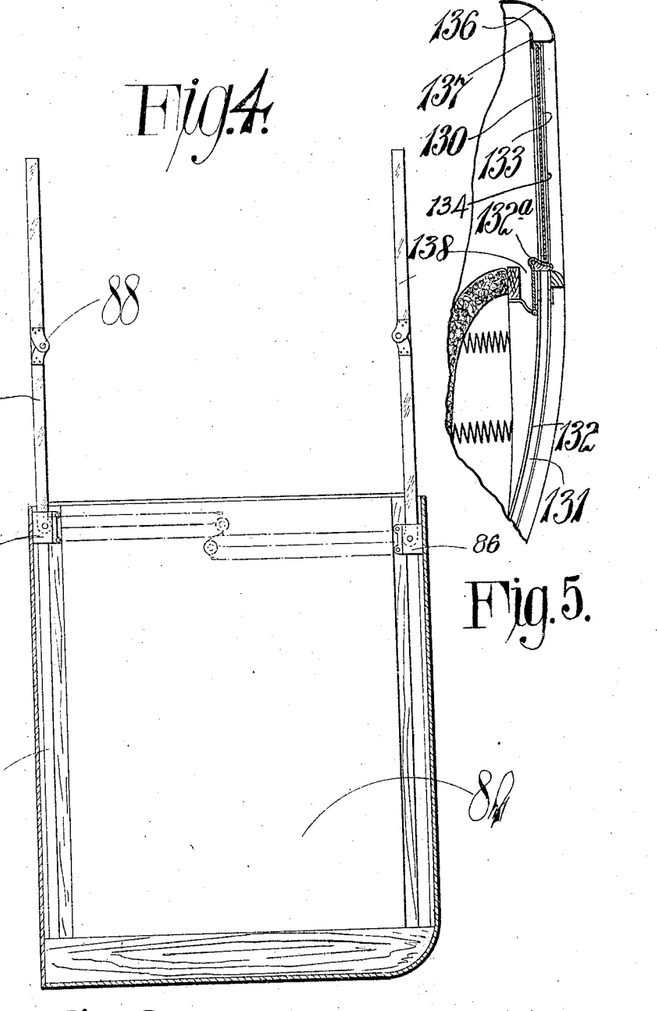
Figure 4 is a sectional view in side elevational showing the pocket or housing and the guides provided for the sliding window.
Figure 5 is a fragmental sectional view showing the rear part of the body of the vehicle fitted with a rear window.
Figure 6:
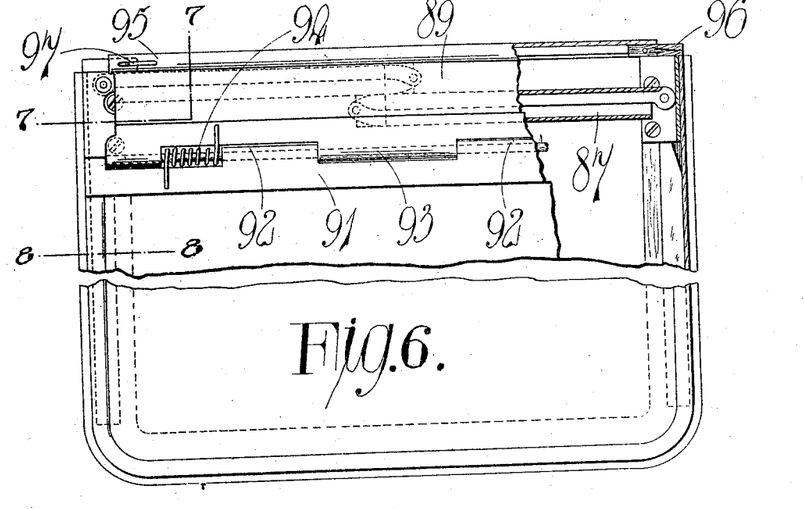
Figure 6 is a sectional view in side elevation showing the flap employed at the upper part of the pocket and forming a closure therefor.
Figure 7:
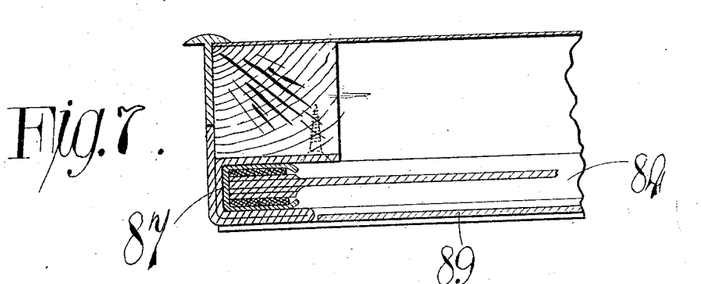
Figure 7 is a sectional plan view upon line 7—7 of Figure 6, with the guide channels erected and the window in partly raised position.
Figure 8:
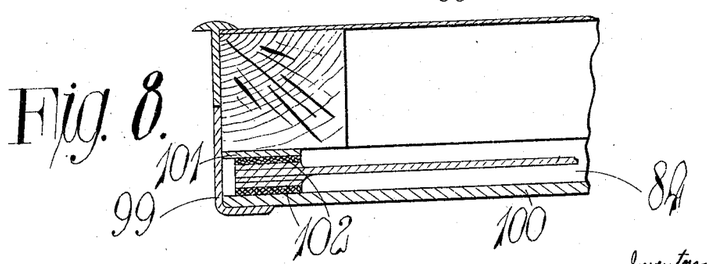
Figure 8 is a sectional plan view upon line 8—8 of Figure 6.

A vehicle door is illustrated in Figure 4 having a housing or pocket 84 for the reception of a sliding window. Brackets 85 and 86 are provided below its upper edge to which are pivoted channel shaped guides 87. These channel shaped guides may be made in one, two or more lengths and if a plurality of lengths are employed they are pivoted together as shown at 88.

The arrangement is such that the vertical edges of the pocket 84 are either formed as channels or guides for the vertical edges of the window when it is lowered, or stationary channels may be provided within these edges of the pocket, or guide strips 110 are placed therein, whilst the channels 87 serve as guides when the window is partially or entirely raised. When the window is completely lowered, however, the channels 87 can be folded away into the upper part of the pocket 84 as shown in dotted lines. The guides or guide strips 110 are arranged to direct the window accurately into the guides or channels 87 when raised.

For raising the windows on the inner side of each pocket we provide an opening 111 preferably normally covered by a flap 112 on the lining material of the vehicle. The fingers can be placed through the opening 111 and the lower edge of the window can be pushed upwardly sufficiently far to cause its upper edge to protrude from the pocket, after which the upper edge can be readily grasped by the hand.

As will be seen from Figures 6 to 9, the upper part of the pocket is provided with an inverted L shaped flap 89 pivoted upon a rod 90. This rod 90 is held in position near the upper edge of the inner side of the pocket by means of a metal strip 91, and this strip is formed with hinge parts 92. Similarly, the flap 89 is formed with hinge parts 93. Between some of the hinge parts 92 and 93 and disposed around the rod 90 are coiled springs 94 which act upon the flap 89 and constantly press it in one direction towards the sliding window which is disposed in the pocket 84.

Figures 9, 10, 11, 12, 13:
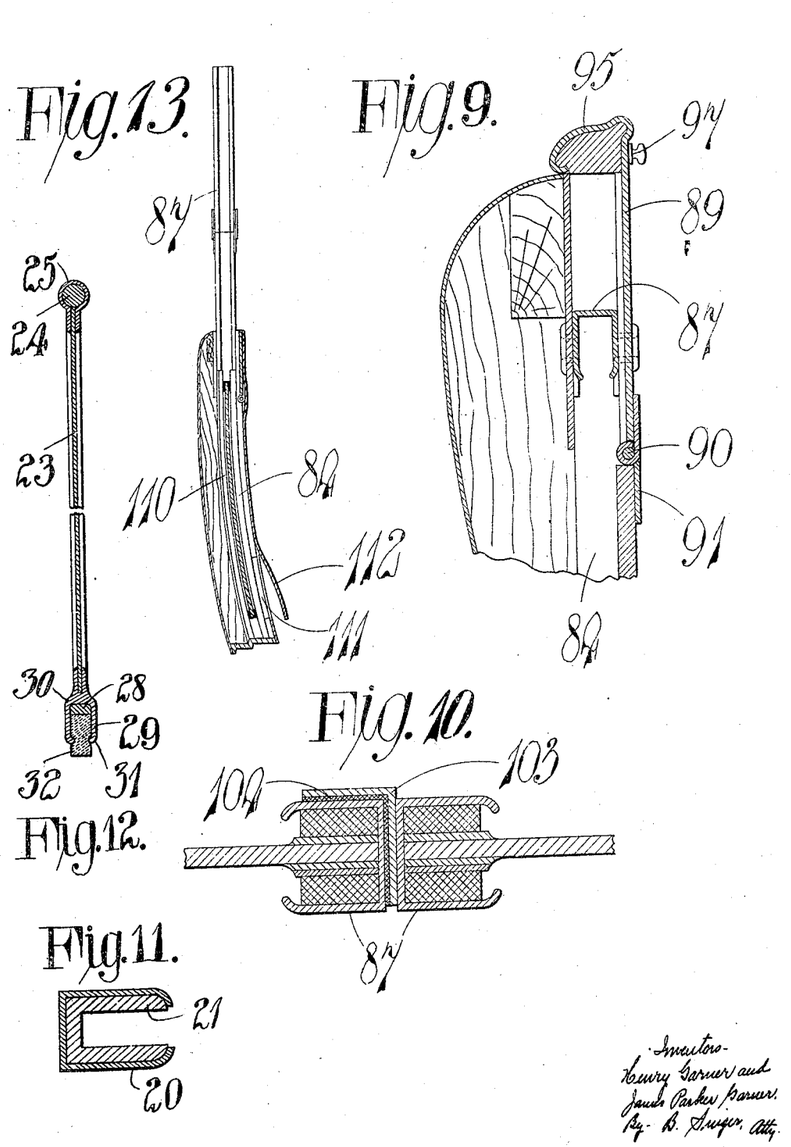
Figure 9 is a sectional end view showing the upper part of a pocket either in the door or body of the vehicle.
Figure 10 is a sectional plan view showing the vertical edges of two adjacent sliding windows.
Figure 11 is a sectional plan view showing an improved form of guide for the sliding edges of the windows.
Figure 12 is a sectional end view of a modified form of sliding window.
Figure 13 is a view in cross section taken through one of the pockets and showing the channel guides in their erect position.

The ends of the horizontal portion 95 of the flap 89 are cut away to allow of the channel guides 87 to be projected from the pocket but when the window is completely lowered and the channel guides are folded into the position shown in dotted lines in Figure 4, the flap 89 moves into the position shown in Figure 9 in which it closes the top of the pocket 84. When in this position members 96 having pin and slot connections 97 with the horizontal portion 95 of the flap may be slidden along upon the underside of the flap until they fill in the cut away portions at the ends of the flap.

As will be seen from the drawings, the horizontal portion 95 of the flap 89 is beaded or bent so that its outer portion provides an incline for discharging rain water on to the inclined outer side of the pocket beneath the flap.

The flap 89 serves when the window is completely open as a closure for the top of the pocket and the flap may be designed to restore the normal appearance of the upper edge of the body so that the presence of the window and guides within the hollow doors or body panels is entirely unsuspected when the flap is closed.

When the window is partially raised, the spring pressure upon the flap causes it to press against the window. This pressure may serve to sustain the window in any position into which it may be raised. It should be observed, however, that the flap bears only upon the thickened edges of the window and not upon the main panel of the window itself so that danger of scratching or otherwise damaging the surface of the window by the pressure of the flap is avoided.

When the window is completely raised, the flap 89 is moved under the lower edge of the window and again forms a closure for the top of the pocket. At the same time it sustains or keeps the window in its raised position.

In many cases the door or side of the vehicle may be curved and in such cases to avoid having to bend metal channels to form the stationary guides in the pocket 84, the pocket 84 may be built up by means of metal angle irons 99 at the vertical edges, a panel of metal or three ply wood 100 to form the inner side of the pocket, suitable packing 101 and felt or other comparatively soft material as shown at 102, the vertical edges of the window 80 themselves sliding between the two thicknesses of the packing 102.

Figure 10 is a sectional plan view showing in section two adjacent channels such as 87 and to one of them is fixed an angle 103 which may be provided with a lining of rubber or the like 104 secured to the angle so that when the channels are in their extended position a weather tight joint is formed between them.

The guides employed for the sliding edges of the window may take the form of metal channels having a packing of felt or like material therein. Instead, however, of using felt or like material, we may employ metal channels contructed as shown in Figure 11 wherein the metal channel 20 is provided with a channel shaped filling member 21 of celluloid or like material. This filling 21 may either be moulded in one piece or it may be filled up of three separate members. It is contemplated that celluloid or like material will give better results in wet weather than felt.

In the construction shown in Figures 2 and 3 the transverse and sliding edges of the window are shown as being thickened with strips of celluloid or similar material secured to the material of the main sheet of the window. This construction is suggested mainly because it has been found desirable to employ for thickening the edges of the window, strips having the same or substantially the same co-efficient of expansion due to variation in temperature as the main sheet of the window itself. If the co-efficients of expansion of the materials used in the window construction were different, there would be danger of buckling or even of the thickening strips becoming loose.

In constructing a sliding flexible transparent window of celluloid or analogous material, it is necessary to select a comparatively thin sheet in order to obtain a maximum of transparency. Such sheets, however, may not be sufficiently stiff to give good results as they may buckle or become dislodged under wind pressure. Hence, the suggestion that the edges should be thickened.

Instead of or in addition to thickening the transverse edges of the window with strips of the same or similar material to the window itself, such edges and also the sliding edges if found desirable may be thickened with metal or other rods or strips. As, however, the co-efficient of expansion due to variations of temperature of metal and the material of which the window is made may be very different, any of the constructions or any equivalent construction to those shown in Figures 12 to 16 may be employed.

In the construction shown in Figure 12, the main panel 23 of the window has its transverse edges stiffened by metal members. At the top a metal rod 24 is employed. This metal rod is not actually fastened to the window but is free or floats in a pocket formed at the top of the window by a moulded or bent strip of celluloid 25 or like material which is cemented or otherwise secured to the upper edge of the main panel. The pocket 26 which is formed to accommodate the rod 24 is longer than the rod 24. The pocket 26 has its ends closed by members which are secured in the ends of the pocket.

At its lower edge this window is stiffened by a metal rod 28 of substantially rectangular form which floats freely in a pocket 29 which is formed by a moulded strip 30 of celluloid or like material cemented to the lower edge of the window. The strip 30 has its lower part formed of channel section having two flanges, the edges 31 of which are somewhat inturned to accommodate a strip or rod 32 which forms a buffer.

It will be understood that the sliding edges of the window may be reinforced by strips of metal of flat section if desired, but if such strips are employed upon the window they should be associated with the window in such manner that they are free to expand to a different degree than the window itself under the influence of increases of temperature.

Figure 14:
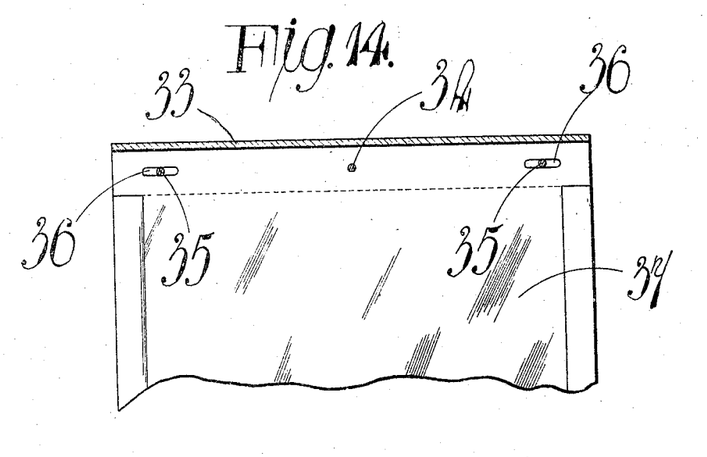
Figure 14 is a side view, partly in section, showing a further modification of the sliding window.
Figure 15:
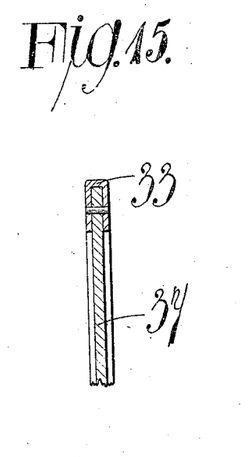
Figure 15 is a detail sectional view of the window shown in Figure 14.

Another construction is shown in Figures 14 and 15 where one of the transverse edges of the window is shown to be stiffened by a metal channel 33 which is riveted to the window at 34 and which is also attached to the window by rivets 35, which rivets, however, are free to move along slots 36 in the main panel 37 of the window.

Figure 16:
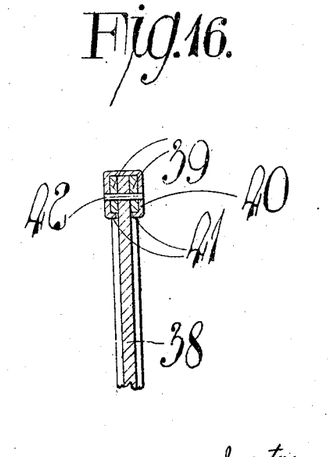
Figure 16 is a detail sectional view of another modified construction of window.

In the construction shown in Figure 16, the main panel 38 of the window is provided with celluloid or like thickening strips 39 and a channel shaped metal member 40 embraces the strips 39 and has inturned edges 41 to engage under the edges of the strips 39. The metal or like channel 40 is prevented from sliding off in an endwise direction by a single rivet 42 passing through the channel 40, the strips 39 and the main panel 38. The employment of a single rivet either at one end or in the centre permits of the differential expansion of the metal or like channel 40 and the window 38 with its thickening strips 39.

In the construction shown in Figure 5, a rear window is illustrated which may be of similar form to any of those already described. This rear window 130 is adapted to be lowered into a curved pocket 131 which has guides therein 132 of similar form to the guides in the other curved pockets. The upper part of the curved pocket 131 is provided with a pivoted flap 132ª of similar construction to the flaps already described, and pivoted to brackets in the upper part of the pocket 131 are movable guides 133 for the vertical edges of the window.

The construction of this window and its pocket with the stationary and movable guides and spring pressed flap is similar in all respects to the windows and the corresponding part already described with the exception that the guides 133 are provided with external flaps 134 to which the adjacent edges of the top covering of the vehicle may be secured by press studs or turn buttons (not shown).

The top covering of the vehicle 136 is, of course, provided with a rectangular opening for the rear window and the top edge of this opening is provided with a bead 137, against which the upper edge of the window may rest when the window is raised.

Adjacent to the flap of the rear curved pocket a clearance 138 is left to allow the flap to be pulled back when it is desired to manipulate the window. This window may be raised from its pocket by pushing it up from the bottom, an opening being provided in the inner wall of the pocket, as described with respect to the windows in the sides of the body.

What we claim then is:—

1. The combination of a sliding window; a pocket for receiving said window when opened; movable guides foldable in said pocket, which guides can be projected to guide the edges of said window when it is slidden; a pivoted flap forming the upper part of the inner wall of said pocket; sliding sections at the ends of said flap for closing the openings necessary for said guides when projected, and means tending to move said flap towards said window, whereby, when the window is fully lowered, said flap moves over the top thereof so as to close the top of the pocket.

2. In a vehicle the combination of a vehicle body having sides which are curved from top to bottom whereby the lower part is located in the space between the wheels and the upper part is of greater width than said space, said sides being hollow and having a curved outer wall and a curved inner wall with a space between forming similarly curved pockets in said sides; resilient transparent windows in said pockets, said windows each consisting of a sheet of transparent celluloid having stiffening portions at its edges which impart thereto a degree of resiliency which permits the window to take the curvature of the pocket but to regain flatness when moved out of said pocket, said windows being guided by guide strips on the sides of said pockets but below the top thereof, and guides mounted on said pivots, for the edges of the windows when raised, said pivots and guides being so located that portions of the guides when raised form aligned continuations of the guide strips upon the sides of the pockets, whereby, when the guides have been extended, the windows, upon being raised, are directed by the guide strips into said guides; flaps pivoted to and forming the upper parts of the inner walls of said pockets; springs acting upon said flaps and pressing them towards the windows, said flaps forming closures for the pockets when the windows are completely opened or closed.

3. In a vehicle the combination of a vehicle the body having sides which are curved from top to bottom whereby the lower part is located in the space between the wheels and the upper part is of greater width than said space; two doors in one of said sides; a pocket having curved inner and outer walls in each of said doors; a pocket having curved inner and outer walls in said side intermediate said doors; a pocket having curved inner and outer walls in said side to the rear of said doors; resilient transparent windows in said pockets; pivots within the upper parts of said pockets but below the top thereof; guides mounted on said pivots, for the edges of the windows when raised; pivoted flaps forming the upper parts of the inner walls of said pockets, and springs acting upon said flaps and pressing them towards the windows, said flaps forming closures for the pockets when the windows are completely opened or closed.

In witness whereof we affix our signatures.

HENRY GARNER.
JAMES PARKER GARNER